Jan. 25, 1966  H. GOLDSCHMIDT  3,230,642
TEACHING AND TESTING APPARATUS
Filed March 7, 1963  5 Sheets-Sheet 1

INVENTOR.
Hans Goldschmidt
BY
Attorneys.

Jan. 25, 1966  H. GOLDSCHMIDT  3,230,642
TEACHING AND TESTING APPARATUS
Filed March 7, 1963  5 Sheets-Sheet 2

INVENTOR.
Hans Goldschmidt
BY
Attorneys.

INVENTOR.
Hans Goldschmidt
BY
Attorneys.

Jan. 25, 1966     H. GOLDSCHMIDT     3,230,642
TEACHING AND TESTING APPARATUS
Filed March 7, 1963     5 Sheets-Sheet 4

INVENTOR.
Hans Goldschmidt
BY
Attorneys.

INVENTOR.
Hans Goldschmidt

United States Patent Office 3,230,642
Patented Jan. 25, 1966

3,230,642
TEACHING AND TESTING APPARATUS
Hans Goldschmidt, Atherton, Calif., assignor to H. Goldschmidt & Associates, Inc., Menlo Park, Calif., a corporation of California
Filed Mar. 7, 1963, Ser. No. 263,582
13 Claims. (Cl. 35—9)

This invention relates to apparatus for teaching and testing and more particularly to such apparatus for use in conjunction with written or otherwise presented test programs.

The apparatus, in accordance with this invention accomplishes its teaching purposes by permitting the student to review a testing program of questions having multiple choice answers and upon selection of one or more of the answers, to be apprised as to whether he is right or wrong.

In apprising the student as to whether he is right or wrong, apparatus in accordance with this invention employs a precoded member, or a plurality of members, having thereon a plurality of continuous answer paths, with each path being divided into incremental sections and single sections from each of the paths together forming a single question area. For instance, there may be four continuous answer paths, each path corresponding to one of several possible multiple choice answers, such as A, B, C and D. The single question areas may be such as to include a single increment from each of the answer paths. One or more of the answer paths in each question area may include a correct answer designation. Means are included to read the correct answer designation and to determine in which path the designation lies. Means are further provided for cyclically transporting the movable member or members in a predetermined, but apparently random, manner.

It is, therefore, a general object of the present invention to provide an improved teaching and testing apparatus.

It is a more particular object of the invention to provide an improved teaching and testing apparatus for use in conjunction with a testing program of the multiple choice answer type.

It is still another object of the present invention to provide an apparatus of the aforementioned character wherein a sequence of answers may be variably precoded within the device.

It is another object of the invention to provide an apparatus of the aforementioned character wherein the individual student operating the apparatus, himself, selects at least a portion of the code.

These and other objects and features of the invention will become more clearly apparent upon a review of the following description in conjunction with the accompanying drawing, in which.

Referring to the embodiment of the invention shown in FIGURES 1 to 4, the general principles of the invention may be readily determined. Generally this embodiment includes a base member 11 having top and bottom portions 13 and 15, respectively, joined together by an edge portion 17. The ends of the top and bottom 15 and 13 remote from the edge 17 are generally semi-circular in form with the terminal portion of the top 13 cut away as at 19 to form a window having shoulders 21 and 23.

A disc 25 (shown more fully in FIGURE 4) is rotatably supported between the top and bottom members 13 and 15 by means of a pin 27.

Figure 4:
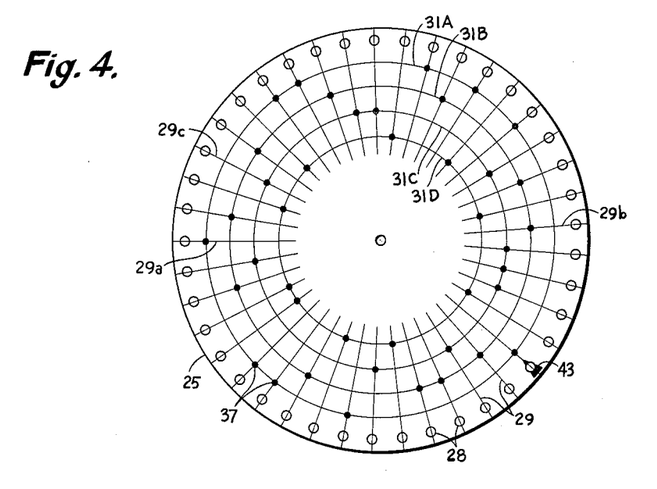
FIGURE 4 is a plan view of a code disc used in conjunction with the apparatus shown in FIGURES 1 to 3.

As can be seen in FIGURE 4, the disc 25 may, for example, be divided into forty-one equal sectors by means of the imaginary radii 29. Eyelets 28 are punched into the disc 25 near its periphery and in alignment with each of the radii 29. Each of the individual radii may be considered a single question area. In addition, there are included four imaginary circles 31A, 31B, 31C, and 31D, each of which may be considered a continuous answer path. Each of the circles 31 may be considered as the path for the multiple choice answer designated by its suffix letter. Each of the imaginary radii 29 includes, as it crosses at least one of the circles 31, a correct answer designation which may, as shown, be merely a large dot 37. Thus, considering the particular imaginary radius 29a, a correct answer designating dot is shown at the intersection of that radius and the "A" answer circle 31A.

Figure 1:
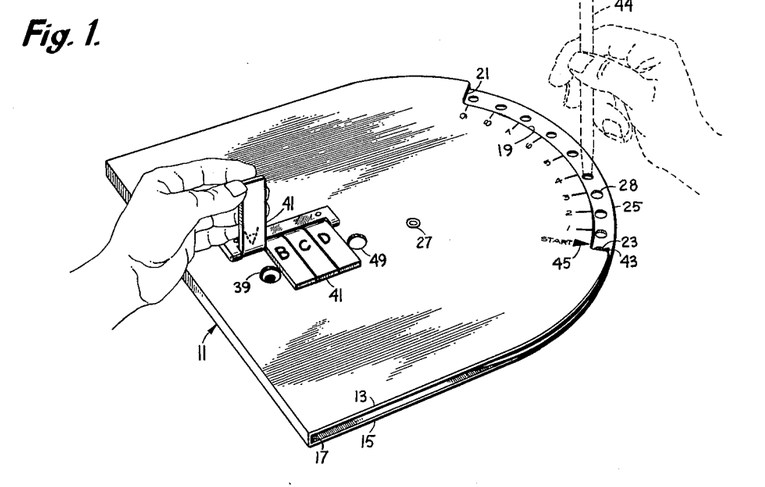
FIGURE 1 is a perspective view of a teaching and testing apparatus in accordance with one embodiment of the invention.
Figure 2:
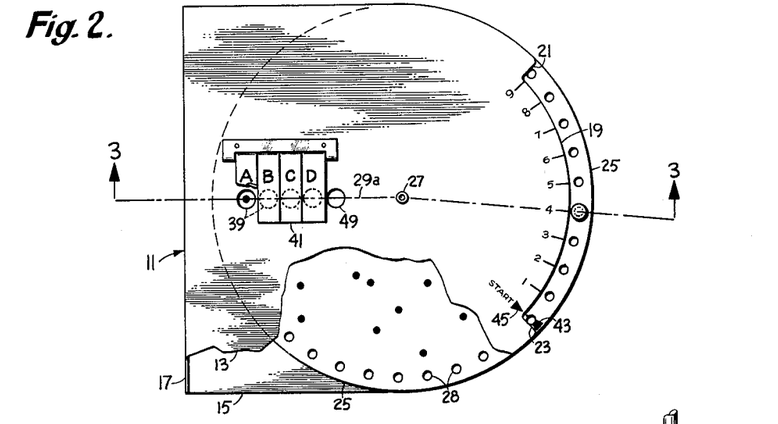
FIGURE 2 is a top plan view of the device shown in FIGURE 1, with parts partially broken away.
Figure 3:
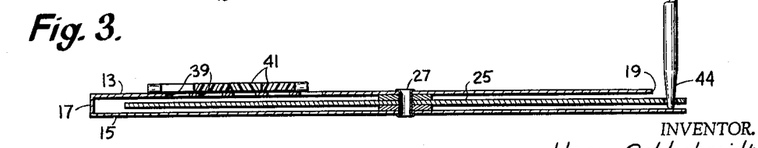
FIGURE 3 is a sectional view taken along the line 3—3 of FIGURE 2.

The upper portion 13 of the base member includes a plurality of windows 39, one corresponding with each of the imaginary circles 31A, 31B, 31C and 31D of the disc 25. A shutter 41 is hinged adjacent each of the windows 39 whereby the disc 25 may be viewed through any selected one of the windows.

In operation of the device shown in FIGURES 1 to 4, the disc 25 is rotated within the base 11 until a start arrow 43 on the disc, lies adjacent an arrow 45 on the base 11. The student is then given a program of questions, each of which is followed by a coded answer. In addition, the student is given a multiple choice of answers, each designated with the letter A, B, C or D and at least one of which is correct.

By way of example, it may be assumed that the correct answer to the first question in the question program is designated in the multiple answers by the letter "B" and that the coded answer given is "3–6–7–5."

The student will insert the coded answer into the apparatus by dialing with a pencil 44 or other means. For this purpose, a scale is provided adjacent the window 19 and the pencil may be placed in the appropriate eyelets 28 thus rotating the disc 25 through a predetermined angle.

Since the eyelets 28, and also the scale numerals, are spaced to correspond to the various radii 29 on the disc 25, it is apparent that when the student dials the four code digits "3–6–7–5" he is, in reality, rotating the disc through an angle corresponding to a number of sectors equal to the sum of the individual digits—twenty-one sectors. It is noted that by counting counterclockwise for twenty-one sectors from the starting radius 29a, the radius 29b is reached. On the radius 29b the correct answer designation appears in the "B" circle 31B. Thus, after rotation in accordance with the code "3-6-7-5," a correct answer designating dot will be located in registry with the window 39 corresponding to the "B" shutter 41.

After rotating a disc in accordance with the coded answer the student then selects, in his mind, the correct answer to the multiple choice question and raises one of the corresponding shutters 41. If he has selected the proper answer "B" he will raise the "B" shutter and find a correct answer designating dot exposed through the corresponding window 39. If, on the other hand, the student selects the wrong answer and consequently raises the wrong shutter 41, no correct answer designation will be found.

To continue the test, the disc 25 is left in the position determined by rotation in accordance with the previous answer. If, for instance, the answer to the next following question is "C" the coded answer may well be "6-5-3-3" giving a sum of digits—seventeen. Since the new starting position of the disc is with the radius 29b (the twenty-first radius) in alignment with the windows 39 and since the sum of digits for the new coded answer is seventeen it is apparent that the disc will be rotated through seventeen additional sectors and will come to rest with the thirty-eighth radius 29c in alignment with the windows 39. As can be noted, the radius 29c includes a correct answer designation at the intersection of the "C" answer path 31C.

It should be realized in the preparation of coded answers, that once an answer A, B, C or D, has been selected, any radius on the disc having that selected answer may be employed. Thus, in the embodiment of the disc shown in FIGURE 4, if the first multiple choice answer is to be "A" any of the radii (counting counterclockwise from the starting radius 29a) v, vi, ix, xvi, xxv, xxvii, xxix, xxxiv, xxxv or xli (0), may be employed. This fact may be more easily realized upon a review of Table No. I, below, which shows the various sectors of radii 29 (designated by Roman numerals to indicate the counterclockwise count for the radius 29a with their corresponding correct multiple choice answers. Thus with the use of Table No. I an instructor may easily prepare the coded answers for a multiple choice test.

radius 29a. On the top portion 13 of the base 11 is included a window 49 through which the question number may be viewed.

Table No. II is provided below to facilitate understanding of the disc shown in FIGURE 5. The table indicates the proper question number and multiple choice answer associated with each radius.

*Table No. II*

| Radius | Question No. and Answer | Radius | Question No. and Answer |
| --- | --- | --- | --- |
| 0 (xli) | 00 | xx | 3B |
| i | 2A | xxi | 1B |
| ii | 4C | xxii | 12A |
| iii | 3C | xxiii | 9B |
| iv | 12B | xxiv | 5C |
| v | 1A | xxv | 1A |
| vi | 5A | xxvi | 2C |
| vii | 10C | xxvii | 11A |
| viii | 2B | xxviii | 6B |
| ix | 9A | xxix | 3A |
| x | 6C | xxx | 1A |
| xi | 8A | xxxi | 9C |
| xii | 4A | xxxii | 5B |
| xiii | 1C | xxxiii | 8C |
| xiv | 11B | xxxiv | 7B |
| xv | 8B | xxxv | 10B |
| xvi | 7A | xxxvi | 12C |
| xvii | 1B | xxxvii | 6A |
| xviii | 10A | xxxviii | 11C |
| xix | 4B | xxxix | 1C |
|  |  | xl | 7C |

It is obvious that the first question of a series to be answered, is question No. 1. Thus, the initial rotation of the disc may be to any of the radii which include a "1" in the question-number circle 47. Moreover, it is apparent from a review of Table No. II that question No. 1 may be answered with either "A," "B" or "C." Assuming the correct answer to be "A," the initial rotation is limited, not only to a radius having a "1" in the circle 47, but also to a radius having a correct answer designation in the "A" answer circle 31A. Upon a review of Table No. II and/or FIGURE 5 this rotation, then, may be to either of the radii v, xxv or xxx.

On the other hand, if the correct answer to the first question is assumed to be "B," rotation is limited to those radii having a "1" in the question-number circle 47 and a

*Table No. I*

| Radius | Answer | Radius | Answer | Radius | Answer | Radius | Answer |
| --- | --- | --- | --- | --- | --- | --- | --- |
| 0 (xli) | A | x | C | xx | C | xxx | D |
| i | C | xi | D | xxi | B | xxxi | C |
| ii | B | xii | B | xxii | D | xxxii | C |
| iii | D | xiii | B | xxiii | B | xxxiii | B |
| iv | D | xiv | C | xxiv | C | xxxiv | A |
| v | A | xv | B | xxv | A | xxxv | A |
| vi | A | xvi | A | xxvi | D | xxxvi | D |
| vii | B | xvii | D | xxvii | A | xxxvii | B |
| viii | D | xviii | C | xxviii | B | xxxviii | C |
| ix | A | xix | C | xxix | A | xxxix | D |
|  |  |  |  |  |  | xl | B |

With the device as previously described, it is apparent that the student must maintain a continuous check upon himself as to which question he is answering since the code is cumulative from the first question to the last of a given series. In order to eliminate this requirement a disc of the type shown in FIGURE 5 may be employed with the base of FIGURES 1 to 3. The disc of FIGURE 5 is similar to that of FIGURE 4 but further includes a question numeral circle 47. While only three answer circles 31A, 31B and 31C are shown, it is apparent that more or less could be used, if desired.

Figure 5:
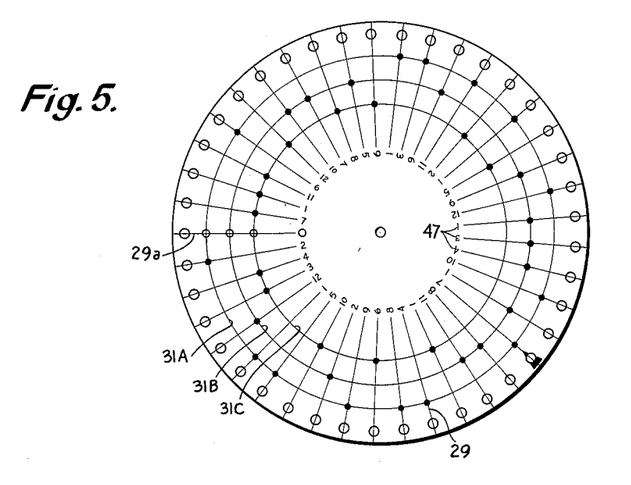
FIGURE 5 is a plan view of another code disc similar to that shown in FIGURE 4 but including a question-number designation within the code.

Like the earlier described embodiment, the disc shown in FIGURE 5 is divided into forty-one equal sectors by the imaginary radii 29. Again the radius 29a is that which lies under the windows 39 when the disc is placed in the starting position. Again the individual radii may be considered as numbered counterclockwise from the correct answer designation in the "B" circle 31B. Referring to Table No. II and/or FIGURE 5, it is noted that radii xvii and xxi fulfill these requirements. Similarly, radii xiii or xxxix may be used if "C" is the correct answer to the first question.

Having once decided which radius is to be employed, a multi-digit code such as that used with the disc of FIGURE 4 may be determined. The code may include any desired number of digits and the number of digits may vary from question to question. As an example, it may be assumed that the first radius to be employed is the radius v. With a five digit code, it is apparent that the only coded answer would be "1-1-1-1-1." But a four digit or three digit code could also be employed as "1-1-2-1" or "2-1-2." Moreover, since the disc is completely rotatable, and further since it includes a total of forty-one sectors, a rotation of forty-six sectors would provide the same result as the rotation of five sectors. Thus, the coded answer may, for instance, be "9–8–4–7–9–9," a six digit code. Again the code is cumulative, and the disc is advanced for each question, by a predetermined number of sectors. While it is possible with the disc of FIGURE 5 alone, to count the number of sectors, or radii, required to advance from one question and answer to the next, Table No. III, below, simplifies the procedure.

Also, it should be realized that several variations are shown in Table No. III for the initial question. Thus, to advance from the start position to a radius indicative of an "A" answer to question No. 1, rotation of 5 (Variation A), 25 (Variation B) or 30 (Variation C) sectors is possible. Hence, the possibility of the student breaking the code is further reduced since several different rotations will produce the same result.

*Tatble No. III*

|  | A | B | C |
|---|---|---|---|
| VARIATION A |  |  |  |
| From 0 to 1 | 5 (46) | 17 | 13 |
| From 1A to 2 | 37 | 3 (44) | 21 |
| From 1B to 2 | 25 | 32 | 9 (50) |
| From 1C to 2 | 29 | 36 | 13 |
| VARIATION B |  |  |  |
| From 0 to 1 | 25 | 21 | 39 |
| From 1A to 2 | 17 | 24 | 1 (42) |
| From 1B to 2 | 21 | 28 | 5 (46) |
| From 1C to 2 | 3 (44) | 10 (51) | 28 |
| VARIATION C |  |  |  |
| From 0 to 1 | 30 | ------- | ------- |
| From 1A to 2 | 12 (53) | 19 | 37 |
| ALL VARIATIONS |  |  |  |
| From 2A to 3 | 28 | 19 | 2 (43) |
| From 2B to 3 | 21 | 12 (53) | 36 |
| From 2C to 3 | 3 (44) | 35 | 18 |
| From 3A to 4 | 24 | 31 | 14 |
| From 3B to 4 | 33 | 40 | 23 |
| From 3C to 4 | 9 (50) | 16 | 40 |
| From 4A to 5 | 35 | 20 | 12 (53) |
| From 4B to 5 | 28 | 13 | 5 (46) |
| From 4C to 5 | 4 (45) | 30 | 22 |
| From 5A to 6 | 31 | 22 | 4 (45) |
| From 5B to 6 | 5 (46) | 37 | 19 |
| From 5C to 6 | 13 | 4 (45) | 27 |
| From 6A to 7 | 20 | 38 | 3 (44) |
| From 6B to 7 | 29 | 6 (47) | 12 |
| From 6C to 7 | 6 (47) | 24 | 30 |
| From 7A to 8 | 36 | 40 | 17 |
| From 7B to 8 | 18 | 22 | 40 |
| From 7C to 8 | 12 (53) | 16 | 34 |
| From 8A to 9 | 39 | 12 | 20 |
| From 8B to 9 | 35 | 8 (49) | 16 |
| From 8C to 9 | 17 | 31 | 39 |
| From 9A to 10 | 9 (50) | 26 | 39 |
| From 9B to 10 | 36 | 12 | 25 |
| From 9C to 10 | 28 | 4 (45) | 17 |
| From 10A to 11 | 9 (50) | 36 | 20 |
| From 10B to 11 | 33 | 20 | 3 (44) |
| From 10C to 11 | 20 | 7 | 31 |
| From 11A to 12 | 36 | 18 | 9 (50) |
| From 11B to 12 | 8 (49) | 31 | 22 |
| From 11C to 12 | 25 | 7 | 39 |

Referring to Table No. III, the lefthand column relates to the various question numbers and the selected correct multiple choice answers for those questions. The three righthand columns indicate the number of sectors or radii the disc must be advanced to obtain the correct answer designation for the next question. When the number of sectors shown is small (12 or less, in the exemplary Table No. III) there is also an indication of an alternative number of sectors through which the disc may be rotated to produce the same result.

As an example of a twelve question quiz the following Table No. IV may be considered.

*Table No. IV*

| Question No. | Answer | Rotation | Coded Answer |
|---|---|---|---|
| 1 | B | 21 | 4-8-7-2 |
| 2 | B | 28 | 8-4-7-9 |
| 3 | A | 21 | 9-3-6-3 |
| 4 | A | 24 | 5-6-7-6 |
| 5 | C | 12 (53) | 2-3-3-4 |
| 6 | B | 4 (45) | 1-1-1-1 |
| 7 | A | 29 | 8-7-7-7 |
| 8 | C | 17 | 3-8-2-4 |
| 9 | B | 31 | 9-8-8-6 |
| 10 | B | 12 (53) | 4-1-1-6 |
| 11 | A | 33 | 9-9-9-6 |
| 12 | C | 9 (50) | 2-1-5-1 |

For the twelve questions shown, each of the answers is preselected as shown in the column designated "Answer." Upon a review of Table III it is apparent that from the zero or start position a rotation of either seventeen (Variation A) or twenty-one (Variation B) sectors may be employed to result in a "B" answer for question Number 1. While either of these rotations may be employed, it is assumed that the rotation of twenty-one sectors is selected. With a four digit code the coded answer may include any four digits, the sum of which adds to twenty-one. Thus, the coded answer may be "4–8–7–2," as shown.

The desired answer for question No. 2 is "B" and from Table No. III it is apparent that to advance from Question No. 1 having an answer of "B" to Question No. 2 also having an answer of B a rotation of twenty-eight sectors is required, it being remembered that Variation B had been previously selected. Again any four digits, the sum of which is twenty-eight may be considered as the code as thus the coded answer "8–4–7–9" may be selected. From the position 2B to 3A a rotation of twenty-one sectors is again required. The coded answer for Question No. 3, then may be the same as that for Question No. 1. On the other hand, a new code, also adding to twenty-one, such as "9–3–6–3" may be selected. Similarly, Table No. III may be employed by the instructor to determine the coded answers, as shown in Table No. IV, for the remainder of the questions.

Thus as the instructor prepares his question and answer sheets for the student's use, the correct answer, as well as the coded answer may be as set forth in Table No. IV.

The student may use the apparatus with the disc of FIGURE 5 substantially as with the disc of FIGURE 4. However, he need not, himself keep in mind the number of the question upon which he is working.

While the coded answers shown in Table No. IV each have four digits, such is not necessary but the code may have any number of digits and the number may vary from question to question.

It should be recognized that the apparatus shown in FIGURES 1 to 5, is such that the student himself knowingly rotates a disc through the coded answers. While the codes and/or the discs may be frequently changed, it is apparent that after relatively long usage the student may realize the correct answer, without correspondence to the question but solely by decoding the coded answer. With the apparatus as shown in FIGURES 6 through 11, the student himself, only partially sets up the code and thus decoding is relatively more difficult. The apparatus shown in FIGURES 6 through 11 employs a principle substantially identical to that shown in the apparatus shown in FIGURES 1 to 4. Moreover, for the sake of explanation, the answer path employed will be as set forth in the disc shown in FIGURE 4.

This teaching apparatus employs a base plate 51 upon which various mechanisms of the apparatus are mounted.

A cover 52 is secured to the base 51 by a lock (not shown) and serves to conceal the mechanism from the view of the student. The apparatus generally includes a plurality of code selecting levers 53a, 53b, 53c and 53d, together with their associated scales 55a, 55b, 55c and 55d. The levers 53a, 53b and 53c, as well as their associated scales are extended through the cover 52 and are thus exposed. The lever 53d and its associated scale 55d, on the other hand, are positioned beneath the cover 52 and are thus concealed.

A code release and lock lever 57 is employed for selectively locking the code or permitting it to be changed. Answer levers 59A, 59B, 59C and 59D are provided for the use of the student. Associated with each of the levers 59 is a window 61A, 61B, 61C and 61D for indication to the student whether or not his answer is correct. A window 63 is included through which the student may readily determine the question number which he is about to answer. Further included are reset knobs 65 and 67 for the coding apparatus in general, and 69 for the question number indicator.

Figure 9:
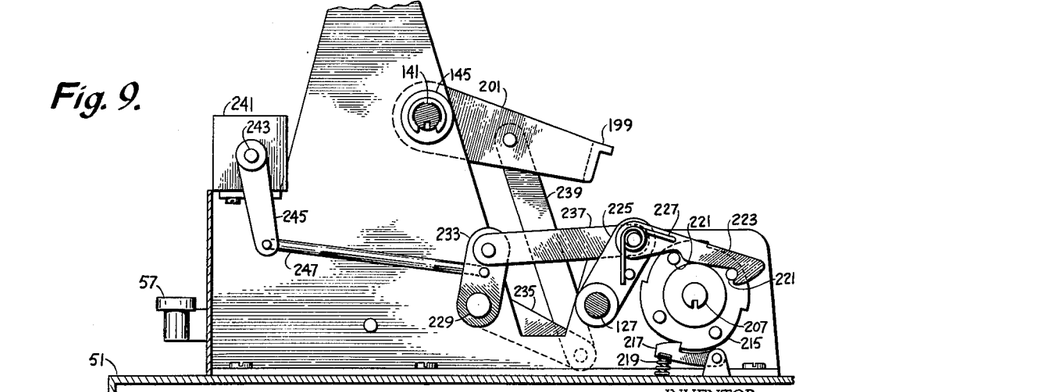
FIGURE 9 is a sectional view taken along the line 9—9 of FIGURE 7.
Figure 10:
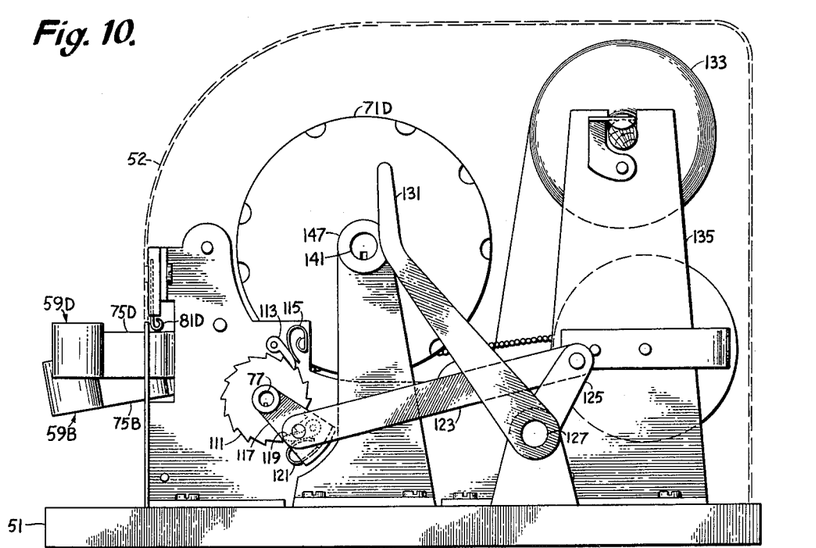
FIGURE 10 is an end elevation taken along the line 10—10 of FIGURE 7.
Figure 11:
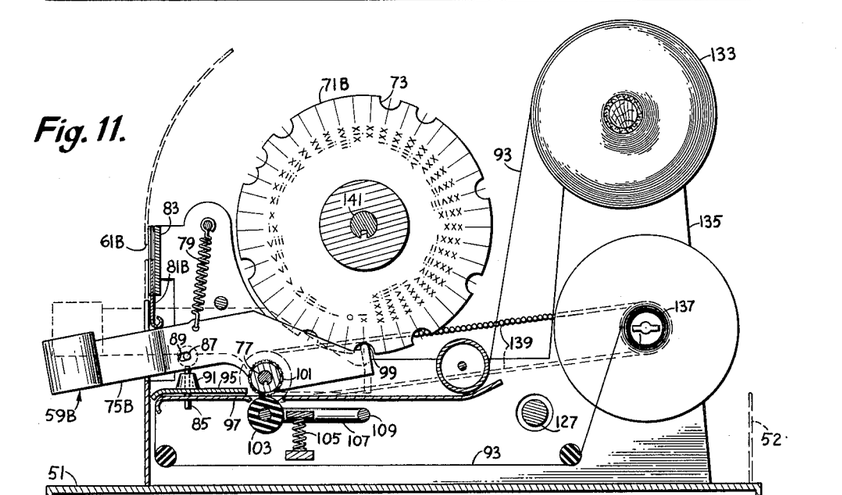
FIGURE 11 is a selectional view taken along the line 11—11 of FIGURE 7.

Generally, the apparatus of FIGURES 6 to 11 further includes a plurality of discs 71A, 71B, 71C and 71D, which together correspond to the disc 25 shown in FIGURE 4. The analogy may be drawn more closely by considering that the disc 71A corresponds to the circle 31A, the disc 71B to the circle 31B and so forth. Thus it is apparent that each of the discs 71 may be considered a continuous answer path for the answers "A," "B," "C," and "D," correspondingly. Like the disc of FIGURE 4 each of the discs 71A, 71B, 71C and 71D may be divided into incremental sectors and, by way of example, the division may be by forty-one equal sectors. The various imaginary radii are shown in FIGURE 11 and designated by Roman numerals. Since the discs 71 correspond to the various answer path circles 31 in FIGURE 4, Table I may be utilized to determine the various radii of each of the discs at which a correct answer designation should appear. Thus for the disc 71B, shown in FIGURE 11, cut-out portions 73 appear at those radii indicative of a multiple choice answer of "B," that is at radii numbered ii, vii, xii, xiii, xv, xxi, xxiii, xxviii, xxxiii, xxxvii and xl. As will be seen hereinafter, the various portions 73 cooperate with other mechanisms of the apparatus to provide the desired correct answer indications. The aforementioned mechanisms of the apparatus correspond to the windows 39 of FIGURE 1, while the discs 71 correspond to the disc 25 of FIGURE 1. Consequently, by rotating the discs 71 in a preselected but coded, manner a predetermined sequence of multiple choice answers is formed.

Each of the levers 59 includes an arm 75A, 75B, 75C and 75D, respectively. Each of the arms 75 is pivoted about a common shaft 77 and is resiliently urged in the clockwise direction, as shown in FIGURE 11, by means of springs 79.

Figure 6:
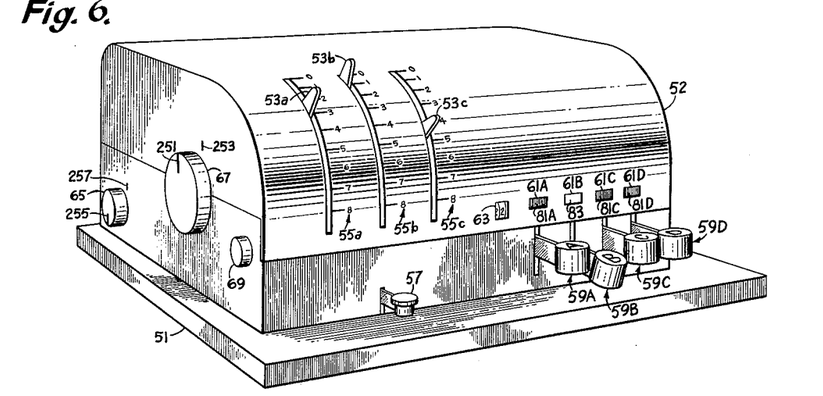
FIGURE 6 is a perspective view of another embodiment of the invention.

Individual window slides 81A, 81B, 81C and 81D ride in guides formed between the windows 61 and a backing plate 83. The window slides 81 ride on the arms 75 and upon downward excursion of any one of the arms, the corresponding slide 81 is lowered whereby the backing plate 83 is exposed through the corresponding window 61. Thus, as shown in FIGURE 6, with the button lever 59B depressed, the backing plate 83 is viewed through the window 61B. The backing plate 83 may be of a color contrasting with that of the window slides 81, such that a student may readily determine whether or not the selected lever 59 is fully depressed.

Also associated with each of the arms 75 is a punch 85A, 85B, 85C and 85D, each of which is pivotally and slidably connected to its associated arm by means of a detent 87 by riding within a slot 89. The punches 85 are guided vertically through guide blocks 91 which are stationary with respect to the base 51. A tape or web of paper 93 is passed between paper guides 95 and 97 and under the punches 85 whereby upon the depression of a lever 59 the paper 93 is punched. Since the punches 85 are aligned transversely across the tape 93, holes punched by each of the various levers 59 will be in longitudinal alignment along the tape.

A finger 99 is secured to one end of each arm 75 as shown in FIGURE 11, with respect to the arm 75B. Fingers 99 cooperate with the various cut-out portions 73 of the associated discs 71. It is apparent that when the finger 99 is in registry with one of the cut-out portions 73, the lever 59 may be depressed as shown in full lines in FIGURE 11. On the other hand, if no cut-out 73 is in alignment with the finger 99, the lever 59 may still be depressed but to a lesser extent. Even the lesser degree of depression, is sufficient to urge a punch 85 through the paper 93.

In operation then, if a student selects a wrong answer as the solution to a question he will depress the wrong lever 59 and will consequently punch a hole in the paper tape 93. However, the partial depression will not be sufficient to permit him to view the backing plate 83 through the associated window 61 and thus he will realize that he has selected the wrong answer. Having selected the wrong answer the student is free to try again before moving on to the next question. If he again selects the wrong answer a similar action will take place wherein the tape will be punched again in a different transverse position but in the same longitudinal position. The student may continue this operation until he finally reaches the correct answer at which time the back plate 83 is visible through the window 61. Thus, even though the student requires several attempts to find the correct answer, the several attempts are recorded on the tape 93 and his grade may be determined accordingly. If the student desires not to make a second attempt for the correct answer after having found one wrong answer, this likewise will be recorded on the tape as a punched hole in the wrong transverse position.

In order to advance the paper tape 93, friction rollers 101 are affixed to the shaft 77 and cooperate with an idler roller 103. The idler 103 is resiliently urged upwards against the rollers 101 by means of a spring 105 acting against an arm 107 which is pivoted as at 109.

The means of rotating the shaft 77 are more clearly apparent in FIGURE 10, wherein it is noted that a ratchet wheel 111 is also secured to the shaft 77. A pawl 113 together with a spring 115 prevents counterclockwise (as seen in FIGURE 10) rotation of the ratchet wheel 111 and the shaft 77.

An arm 117 is pivotally mounted on the shaft 77 and carries therewith a ratchet pawl 119 resiliently urged by means of the spring 121 toward the ratchet wheel 111. A link 123 is connected to the arm 117 whereby, upon reciprocal motion of the link 123 generally along its axis, the ratchet wheel 111 and consequently the shaft 77 is stepped in the clockwise direction. The opposite end of the link 123 is pivotally connected to a crank arm 125 which in turn is connected to a shaft 127. As will be explained more fully hereinafter the shaft 127 is connected to an operating handle 131 which is depressed and raised to advance the shaft 77 and the paper 93 prior to the student's answering each question.

A supply reel 133 for the paper 93 is rotatably mounted in brackets 135. A take-up spool 137 is likewise rotatably mounted in the brackets 135. A chain drive 139 connects the take-up spool 137 to the shaft 77 whereby upon each rotation of the shaft 77, spool 137 is slightly rotated to take-up excess paper web. Thus a record of the student's test is maintained on the spool 137 and may be removed by the instructor at a later date. Since it is expected that the test record will be removed periodically the active radius of the takeup spool will not vary excessively and consequently no means are required in the chain drive to accommodate a varying radius takeup spool.

Figure 7:
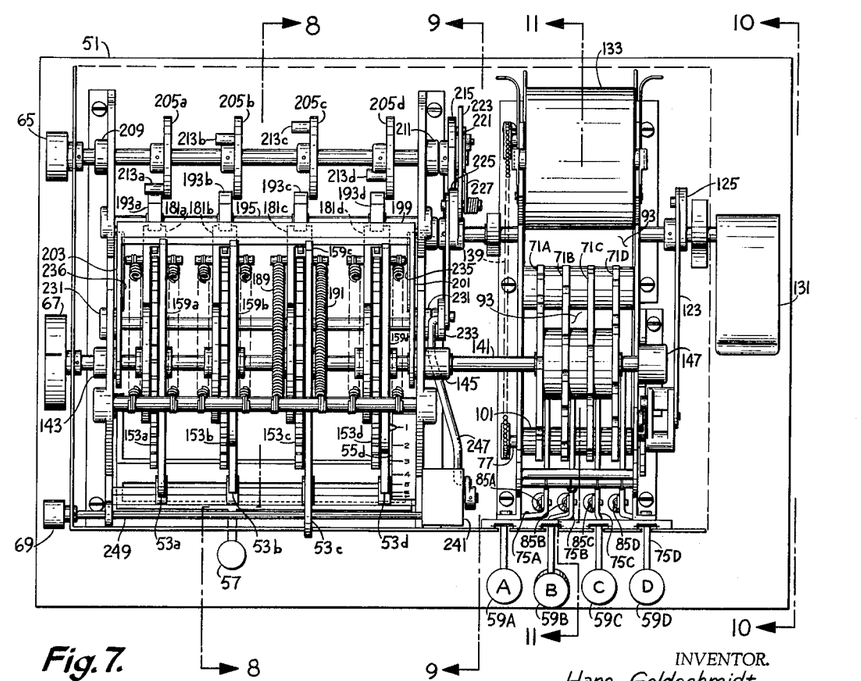
FIGURE 7 is a top plan view of the embodiment shown in FIGURE 6 but with the cover thereof removed.

In the embodiments of the invention shown in FIGURES 1 to 5, the student himself knowingly rotates the disc 25 by incremental amounts. In the embodiment of FIGURES 6 through 11, on the other hand, the discs 71 are advanced by means of mechanism shown to the left of the chain drive 139, as shown in FIGURE 7.

The shaft 141 to which is secured each of the discs 71 is journaled in bearings 143, 145 and 147. A plurality of ratchet wheels 153a, 153b, 153c and 153d are also secured to the shaft 141. The number of teeth in each of the ratchet wheels 153 is the same as the number of sectors into which the discs 71 are divided. Thus, in the example given, each of the ratchet wheels 153 includes forty-one teeth. Moreover, the teeth of the various ratchet wheels are in registery with each other.

Adjacent each of the ratchet wheels 153 and freely pivotable about the shaft 141 are stop members 159a, 159b, 159c and 159d to which are secured the various levers 53. As can be seen more clearly in FIGURE 8, in addition to the levers 53, each of the stop members includes a stop dog 163, and an arcuate section 165, including a plurality of detents 167. The detents 167 have an angular spacing similar to the spacing of the teeth of the ratchets 153. A spring 169 coacts with the detents 167 to indicate positive positions of the members 159. In addition, the detents 167 of all of the members 159 cooperate with a locking bar 171 in order to prevent inadvertent change of the code during operation of the apparatus. The locking bar 171 is secured to a crank member 173 which is pivoted as at 175. The release and lock lever 57 is also affixed to the crank member 173 and a spring 177 cooperates therewith to resiliently urge the locking bar 171 into the detents 167. Upon depressing the lever 57 the code, as will be seen hereinafter, may be changed by rotating the levers 53 to a new position in accordance with the scales 55.

Also pivoted about the shaft 141 and associated with each of the ratchet wheels 153 are arms 181a, 181b, 181c and 181d. Each of the arms 181 carries a ratchet pawl 83 which is resiliently urged into contact with the ratchet wheels 153 by means of the spring 185. The arms 181 also include a shoulder 187 which cooperates with the stop dog 163, whereby rotation of the arms 181 in a clockwise direction may be limited dependent upon the rotary position of its associated stop member 159. Thus, referring to FIGURE 8 it is noted that upon release of the arm 181c it will rotate through an angle equivalent to that defined by four teeth of the ratchet wheel 153c. The rotation of the arm 181c is then arrested by means of the arm 163. During this rotation the arm 181c by means of the pawl 183, carries the ratchet wheel 153c and consequently the shaft 141. By rotation of the shaft 141, discs 71a, 71b, 71c and 71d are likewise rotated.

Each of the arms 181 is resiliently urged in a clockwise direction by means of springs 189 and 191. Latch members 193a, 193b, 193c and 193d are provided to independently and selectively retain each of the arms 181 from rotation under the influence of the springs 189 and 191. Each of the members 193 are pivotally supported on a common rod 195 and resiliently urged in a clockwise direction by means of springs 197.

Also retaining the arms 181 against the tension of the springs 189 and 191 is a reset bar 199. The reset bar 199 is formed at the ends of arms 201 and 203 which are pivotally supported about the shaft 141.

As will be seen more clearly hereinafter, during the operation, the reset bar 199 lies in the position shown in dashed lines in FIGURE 8, whereby the release of the arms 181 is totally under the influence of the latch members 193. As the machine is shifted to accommodate a new question, the reset bar 199 is urged counterclockwise (as seen in FIGURE 8) about the shaft 141 to return the released arm 181 to cooperative relationship with its associated latch member 193.

Figure 8:
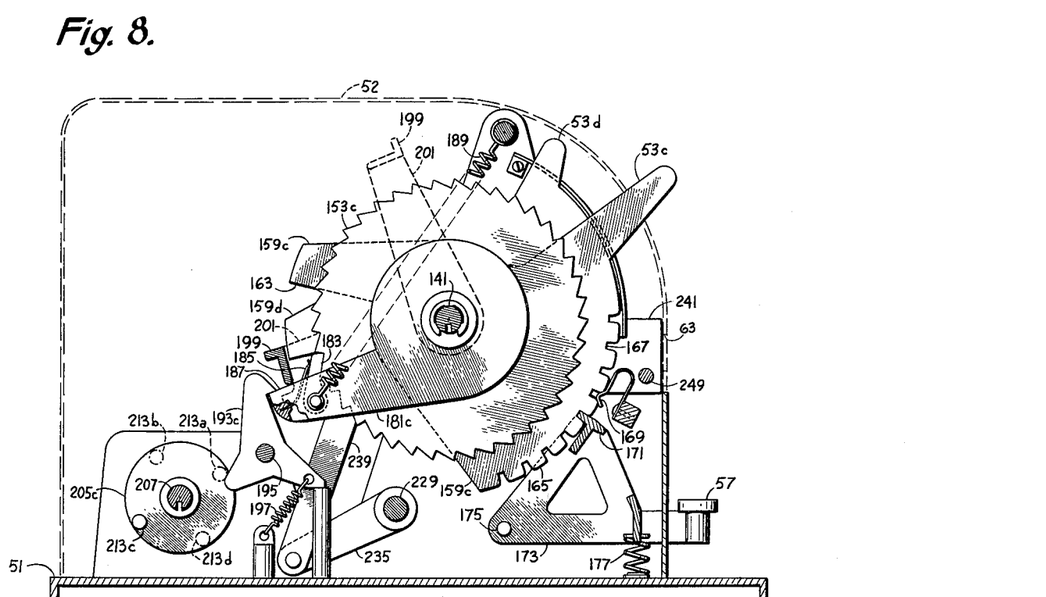
FIGURE 8 is a sectional view taken along the line 8—8 of FIGURE 7.

Latch members 193 are operated one at a time by rotation in the counterclockwise direction (as seen in FIGURE 8) about the rod 195. Generally, for a single question, only one of the members 193 is operated whereby only one of the arms 181 is permitted to rotate carrying its ratchet wheel 153.

In order to operate the latch members 193, a plurality of sequence selection wheels 205a, 205b, 205c and 205d are provided. Each of the wheels 205 are fixed on a shaft 207 which, in turn, is journaled in bearings 209 and 211. Each of the wheels 205 includes a cam finger 213a, 213b, 213c and 213d. As can be seen in FIGURE 8 with the fingers 213a and 213b shown in phantom and the finger 213d shown in dashed lines, the individual fingers are displaced about the shaft 207 at 90° intervals. Thus, it is apparent from viewing FIGURE 8 that upon rotation of the shaft 207, the latch member 193a is first (with the apparatus in the position shown) operated followed by members 193b, 193c and 193d, in order. Thus, the wheels 205a, 205b, 205c and 205d and their respective fingers 213 serve to select the sequence by which the various arms 181 are released.

Means are provided to rotate the shaft 207 by 90° each time the machine is set for a new question. As seen in FIGURE 9, the shaft 207 has affixed thereto a ratchet wheel 215. A ratchet pawl 217 and a spring 219 are associated with the wheel 215 to prevent clockwise rotation as seen in FIGURE 9. Four pins 221 are secured to the wheel 215 at 90° intervals about the shaft 207. A hook arm 223 overlies the pins 221 and the hook at one end thereof latches one of the pins 221. The other end of the hook arm 223 is pivotally secured to a crank 225 which is fixed to the shaft 127. A spring 227 is provided to resiliently urge the hook arm 223 in the clockwise direction about its pivoted connection with the arm 225 and thus into latching engagement with one of the pins 221. As mentioned hereinabove and as will be more fully explained hereinafter, the shaft 127 is oscillated about its axis each time a new question is set into the machine. Upon this oscillation of the shaft 127 the crank arm 225 swings first to the left carrying therewith a pin 221 and rotating the ratchet wheel 215 by 90°. Subsequently the crank arm is rotated to the right whereby the hook arm 223 engages the next adjacent pin 221. Consequently, as the machine is set for a new question the shaft 207 and thus each of the wheels 205 is rotated through 90°.

Operation of the reset bar 199 is also caused by rotation of the crank 225. To produce this operation a shaft 229 (FIGURES 8 and 9) is rotatably journaled in the bearings 231 (FIGURE 7). Crank arms 233, 235 and 236 are rigidly affixed to the shaft 229. The end of the crank arm 233 is connected to the crank 225 by means of a link 237. The crank arms 235 and 236 are connected to the arms 201 and 203, respectively, by means of links 239. Thus it is apparent that upon counterclockwise rotation of the shaft 127 the arms 201 and 203 are also rotated counterclockwise (as viewed in FIGURE 9) and the reset bar 199 is raised to the position shown in dashed lines in FIGURE 8. Upon reverse rotation of the shaft 127, the bar 199 is returned to the position shown in solid lines in both FIGURES 8 and 9.

In order to keep the student continually apprised of the particular question number on which he is working, a counter 241 (which may be a standard commercial counter of, for example, the type produced by Veeder-Root, Inc., Hartford, Connecticut, and known as Series No. 1122) is employed. With the particular counter employed counting is accomplished by oscillating the input shaft 243. To provide this oscillation a crank 245 is secured to the shaft 243 and a link 247 connects the crank 245 to the crank arm 233, previously described. Thus upon each oscillation of the shaft 127, the counter 241 registers a new count.

Counter reset knob 69 (FIGURES 6 and 7) is connected to the counter by means of the shaft 249 whereby, upon the end of a test period, the counter may be reset to zero. The reset wheels 65 and 67 associated with the shafts 207 and 141, respectively also serve to place the machine in its original operation condition. Thus, the reset knob 67 is used to rotate the disc 71A, 71B, 71C and 71D to a zero position, such that the zero radius of each is in alignment with its associated finger 99. Indicating lines 251 and 253 may be employed to assist the student in resetting the code wheels 71 to this position.

The reset knob 65 is employed to reset the wheels 205a, 205b, 205c and 205d such that upon initiating a question program, the machine operation will begin with the correct ratchet wheel 153. Reset lines 255 and 257 are employed for this purpose.

Operation of the apparatus shown in FIGURES 6 to 11 may be more easily explained assuming a particular example. The instructor may prepare the machine by removing the cover 52 and by setting therein a hidden code number. The hidden number is set into the machine by depressing the code release and lock lever 57 and by rotating the lever 53d to the position on the scale 55d indicative of the desired hidden number. In the example shown, the hidden number is "1."

While the cover 52 is removed the instructor may remove any used tape 93 from the spool 137 (FIGURE 11). The cover 52 is then replaced and locked into position and the machine may then be given to the student.

The student may set the machine for initial operation, first by rotating the sequence reset knob 65 until the indicia 255 and 257 are in alignment.

While so rotating the knob 65, the handle 131 should be held in its upper position. Thus, the reset bar 199 will be held down and the arm 181 will be held in position even as the latch members 193 are operated by the rotating knob 65, shaft 207 and wheels 205. Since the starting position of the knob 65 is 180° displaced from the position shown in the drawing, it will be apparent that, in the starting position, the shaft 207 (FIGURE 8) will be rotated such that the first latch member 193 to be activated in a question series will be the member 193c. Note that rotation of the shaft 207 by 180° places the finger 213c immediately adjacent the crank 193c.

The student may then set the various decoding discs 71a through 71d to the proper starting position by rotation of the reset knob 67 until the indicia 251 and 253 are in alignment. In addition, the counter reset knob 69 may be rotated until the counter indicates the starting position "00" through the window 63.

The student is then given a code number to set into the machine. This code is set by depressing the code release and lock lever 57 and manipulating the levers 53a, 53b and 53c to the position on the scale 55, indicated by the code. As shown in the drawing, the code selected for the example is "2-0-4" thus the student, after depressing the lever 57, manipulates the lever 53a until it registers with "2" on its associated scale 55a. The levers 53b and 53c are likewise manipulated until they are opposite the scale readings "0" and "4," respectively. At this point the machine is ready for operation.

In order to operate the machine, the student first depresses the operating handle 131 (FIGURE 10). Depression of the handle 131 causes rotation of the shaft 127 in a counterclockwise direction as shown in FIGURES 9 and 10. Thus, with this downward motion the paper tape or web 93 is advanced by means of the mechanical train including the crank arm 125, link 123, arm 117, racket pawl 119, racket wheel 111, shaft 77, and the friction rollers 101.

In addition, referring to FIGURES 8 and 9, counterclockwise rotation of the shaft 127 causes the reset arm 199 to be raised to its upper position, shown in dashed lines in FIGURE 8, whereby each of the arms 181 is retained in position merely by its associated latch member 193.

Moreover, counterclockwise rotation of the shaft 127 causes the hook arm 123 to rotate the ratchet wheel 215 and the shaft 207 such that one of the crank arms 193 is operated to release its associated arm 181. In the particular example given, as mentioned hereinabove, it is noted that initially the crank arm 193c releases the arm 181c. Thus the arm 181c is resiliently urged by means of springs 189 and 191 in a clockwise (FIGURE 8) direction carrying along with it its associated ratchet wheel 153c. This clockwise rotation continues until the motion of the arm 181c is arrested by means of the stop dog 163 which has been previously set. It will be remembered that the lever 53c in the code given was set to the position "4" on the scale 55 (FIGURE 6). Thus the ratchet wheel 153 is rotated through an angle equivalent to the arc determined by four ratchet teeth and the shaft 141 is likewise rotated.

Rotation of the shaft 141 causes a similar rotation of the discs 71A, 71B, 71C and 71D whereby the first coded answer is derived. Upon a review of Table No. I it is noted that by moving from the "0" position through four individual radii, the multiple choice answer is "D."

After depressing the handle 131 the student raises it to its fully upward position. Raising the handle 131 causes clockwise rotation of the shaft 127. Since the shaft 77 (FIGURES 10 and 11) and the shaft 207 (FIGURE 9) are connected to the shaft 127 merely through ratchet devices, reverse rotation of the shaft 127 will cause no additional operation of these shafts. On the other hand, the reset bar 199 is positively connected to the shaft 127 such that upon the reverse rotation of the shaft 127 the reset bar 199 is urged downward. The downward motion of the bar 199 causes the previously released arm 181c to be again urged into contact with its respective latch member 193c.

At this point the counter 241 will show the number "01" through the window 63 indicating that the student is to answer question No. 1. After reading question No. 1 the student may depress the proper lever 59 to indicate his preference. If he has selected the correct answer which, in this case is "D," the backing plate 83 will be visible through the window 61D and the tape 93 will be punched in the "D" position.

After having answered the first question the student again depresses the handle 131 and raises it whereby again the paper tape 93 is advanced and the sequence selector wheels 205 are rotated. Thus the next consecutive arm 181d is released. Since the hidden lever 53d is set at the "1" position, the arm 181d will be permitted to travel through an arc equivalent to that defined by one tooth of the ratchet wheel 153. Thus the shaft 141 will be rotated by a single increment rather than four increments as when the arm 181c was released. Thus, with the particular code set forth, it is apparent that the shaft 141 will in sequence be rotated by angles equivalent to those defined by four, one, two and zero ratchet teeth. Of course, the angles defined by the ratchet teeth are equivalent to the angles separating the various radii on the code wheel 71 as shown in FIGURE 11.

Referring then to Table No. I, the correct multiple choice answer for the code can be determined by first counting four radii (since the machine has been set to start operation with release of the arm 181c which was set to "4") from the starting position the first answer is seen to be "D." The next number in the code is "1" and consequently, the answer to the second question may be determined by counting one additional radius on Table No. I. At this point the count is at radius number v and the answer is seen to be "A." Similarly, the third answer can be shown by counting two additional radii along Table No. I and thus it is apparent that the third answer will be "B." If the count for the fourth answer is zero it is also apparent that the fourth answer will likewise be "B." By continuing the count through Table No. I in the sequences of 4–1–2–0–4–1–2–0, etc., the various answers set forth by the code become apparent.

It should be realized that any or all of the various discs 71A, 71B, 71C and 71D may be changed to completely vary the code. Not only can the discs themselves be changed but the number of increments about them will likewise be changed. It should be realized, however, that if the radial increments about the discs 71 are changed, the number of teeth in the ratchet wheels 153 should be similarly changed.

The code can be changed by the student for each test by merely resetting the various levers 53a, 53b, and 53c. Moreover, the overall code may be changed periodically by the instructor's resetting the hidden lever 53d. In addition, variations can be made by the instructor by changing the relative positions of the sequence wheels 205 such that the sequence of operation and release of the arms 181 is varied.

While the correct answer indicating device has been described merely as a plurality of window slides 81, it is apparent that various other indicating means, such as lamps, buzzers, or the like, would be suitable. While it is possible to prevent any depression of the levers 59 if the wrong answer is selected, it is felt preferable to permit sufficient depression whereby the paper tape is punched thereby indicating to the instructor that the student required more than one answer selection. In addition, it is obvious that the depression of any one of the levers 59 could be made to advance the machine to the next question rather than requiring the repeated depression of the handle 131. Many other variations of the machine will become obvious to those skilled in the art.

The similarities of the various embodiments of the invention are apparent upon a review of their descriptions. It should be noted, however, that the embodiment of FIGURES 6 to 11 differs from the other embodiments in that the code therein is necessarily repetitive due to the finite number of ratchet wheels 153 and associated mechanism. If desired, the code for the earlier embodiments could likewise be repetitive by merely repeating a finite series of coded answers. Thus, referring to Table IV, the first four coded answers (or any other finite series) could be repeated whereby the disc is rotated by the repetitive amounts of 21–28–21–24–21–28–21–24–21 and so forth.

In addition, it should be recognized that certain principles and features of the invention may be accomplished by a precoded member having but a single answer path but with differentiating correct answer designations therein. For instance, the disc shown in FIGURE 4 could include the single answer path such as the imaginary circle 31A with a correct answer designation at each intersection of the circle 31A with the various imaginary radii 29. In such instances, however, the correct answer designations would vary from radius to radius and may include the letters "A," "B," "C" and "D" rather than the dots as shown in the drawing. Thus, at the radius 29a the correct answer designation would be an inscribed "A" on the disc; at radius 29b an inscribed "B"; and at radius 29c an inscribed "C.". The correct answer designation of such a device would always appear in the same window 39.

I claim:

1. Teaching and testing apparatus comprising cyclically movable means, said cyclically movable means including a plurality of continuous answer paths, each of said answer paths defining a plurality of incremental sections, single ones of said sections from each of said answer paths defining single question areas, a sequence of said single question areas being located about said cyclically movable means in an irregular array whereby sequential ones of said single question areas are separated from each other by variable angular spacing, at least one of said answer paths, in each of said single question areas, including a correct answer designation, means for reading and for determining in which path the correct answer designation lies in each single question area, and means for advancing said cyclically movable means from one single question area in said sequence to the next single question area in said sequence.

2. Teaching and testing apparatus as defined in claim 1 further including a counter operative in response to the advance of the cyclically movable means from one single question area to another to sequentially indicate a question number.

3. Teaching and testing apparatus as defined in claim 2 wherein said cyclically movable means comprises a disc, a plurality of detents on said disc corresponding in number to the number of single question areas, a base member, said disc being rotatably secured to said base member, said detents comprising means for rotating said disc about said base whereby the disc is advanced from one single question area to another.

4. Teaching and testing apparatus as defined in claim 3 together with scale means on said base member and adjacent said disc whereby the amount by which said disc is to be rotated on said base member may be readily measured.

5. Teaching and testing apparatus according to claim 1 further including a base member and wherein said cyclically movable means comprises a shaft rotatably supported adjacent said base member, a plurality of circular discs defining said continuous answer paths affixed to said shaft for rotation therewith, each of said discs including a plurality of imaginary radii defining said incremental sections, each of said discs, at individual ones of said imaginary radii, including correct answer designations, means on said base member and adjacent said discs for reading said correct answer designations and for indicating on which of the discs a correct answer designation appears, means for rotating said shaft through an angle whereby the reading and indicating means is in registry with various ones of said radii in succession.

6. Teaching and testing apparatus as defined in claim 5 wherein said correct answer designations comprise cutout portions at the periphery of said discs, said means for reading said correct answer designations and for indicating on which of the discs a correct answer designation appears, comprising a finger disposed adjacent each of said discs, said finger being movable into the cut-out portions of its associated disc when said cut-out portions are in registry therewith.

7. Teaching and testing apparatus as defined in claim 6, together with a paper tape, a plurality of punches, one for each of said discs, disposed adjacent said paper tape, means for moving said paper tape past said punches in response to operation of the means for rotating said shaft, and means responsive to movement of said fingers for passing one of said punches through the paper tape.

8. Teaching and testing apparatus as defined in claim 6 together with display means associated with each of said fingers, said display means being operative, in response to the movement of one of said fingers into a cut-out portion on its associated disc, to indicate the movement into the cut-out portion.

9. Teaching and testing apparatus comprising a base member, a shaft rotatably supported adjacent said base member, a plurality of circular discs affixed to said shaft for rotation therewith, each of said discs including a plurality of imaginary radii, each of said discs, at individual ones of said imaginary radii, including correct answer designations, means on said base member and adjacent said discs for reading said correct answer designations and for indicating on which of the discs a correct answer designation appears, means for rotating said shaft through an angle whereby the reading and indicating means is in registry with various ones of said radii in succession, the last named means comprising a plurality of shaft rotating members affixed to said shaft for rotation therewith, adjustable stop means disposed adjacent each of said shaft rotating members, means for independently adjusting the position of each of the adjustable stop means about said shaft, said adjustable stop means cooperating with said shaft rotating members to limit the rotation thereof and of the shaft in accordance with the adjusted position of the stop means, and means for applying a rotative force to said shaft rotating members one at a time whereby the rotation of the shaft and of the circular discs is executed in accordance with the position of the adjustable stop means.

10. Teaching and testing apparatus as defined in claim 9 together with a cover, a plurality of said adjustable stop means extending through said cover to the outside thereof and at least one of said adjustable stop means being completely within said cover.

11. Teaching and testing apparatus comprising a base member, a shaft rotatably supported adjacent said base member, a plurality of circular discs affixed to said shaft for rotation therewith, each of said discs including a plurality of imaginary radii, each of said discs, at individual ones of said imaginary radii, including correct answer designations, means on said base member and adjacent said discs for reading said correct answer designations and for indicating on which of the discs a correct answer designation appears, means for rotating said shaft through an angle whereby the reading and indicating means is in registry with various ones of said radii in succession, the last named means comprising a plurality of ratchet wheels affixed to said shaft, adjustable stop means disposed adjacent each of said ratchet wheels, means for independently adjusting the position of each of the stop means about the shaft, a plurality of arms rotatably supported on said shaft and disposed adjacent each of the ratchet wheels, each of said arms carrying a ratchet pawl in operative relationship with its associated ratchet wheel, each of said arms including detent means for cooperation with said stop means, resilient means for urging said arms about said shaft in that direction causing engagement of the ratchet wheels with the ratchet pawls, latch means for releasably restraining each of said arms against the action of said resilient means, means for selectively releasing said latch means whereby rotation of the shaft and of the circular discs is executed in accordance with the positions of the adjustable stop members, and means for returning the released arm to co-operative relationship with its associated latch means.

12. Teaching and testing apparatus comprising a base member, said base member defining a plurality of correct answer windows, shutter means removably covering each of said windows, a circular disc rotatably supported on said base member and extending across said correct answer windows, said circular disc defining a plurality of imaginary radii and concentric circles, each of said imaginary circles lying in registry with one of said correct answer windows on the base member, plural intersections of said circles with said radii being grouped to define single question areas, a sequence of said single question areas being located about said disc in an irregular sequence of said radii whereby sequential ones of said single question areas are separated from each other by variable angular spacing, correct answer designating means disposed at one of said intersections within each single question area, a plurality of detents on said disc, one of said detents corresponding to one of each of said imaginary radii, and scale means on said base and lying adjacent said detents on the disc, said scale means including indicia thereon corresponding to a plurality of adjacent radii on the disc whereby the disc may be rotated by predetermined numbers of imaginary radii in an irregular sequence thereof to advance the single question areas in a regular sequence.

13. Teaching and testing apparatus as defined in claim 12 wherein said base member further includes a question number window, said disc further including a plurality of sequential indicia arranged in an irregular sequence of said radii in a circle concentric with said imaginary circles for indicating question numbers, said circle including the indicia indicative of question numbers lying in registry with said question window on the base member.

References Cited by the Examiner
UNITED STATES PATENTS

| | | | |
|---|---|---|---|
| 1,929,872 | 10/1933 | Lavery et al. | 35—22 |
| 2,093,813 | 9/1937 | Macourek | 273—143 |
| 2,099,173 | 11/1937 | Norris | 273—143 |
| 2,155,957 | 4/1939 | Ruth | 35—74 |
| 2,311,055 | 2/1943 | Kopas | 35—9 |
| 2,545,381 | 3/1951 | Prentice | 35—9 |
| 2,663,091 | 12/1953 | Brown | 35—9 |
| 2,907,123 | 10/1959 | McMahon | 35—9 |
| 2,924,025 | 2/1960 | Salisbury et al. | 35—9 |
| 2,970,387 | 2/1961 | Dean | 35—9 |
| 3,093,913 | 6/1963 | Wyllie et al. | 35—9 |
| 3,114,212 | 12/1963 | Cisin | 35—74 |
| 3,136,074 | 6/1964 | Hawkins | 35—9 |

EUGENE R. CAPOZIO, *Primary Examiner.*

JEROME SCHNALL, SHELDON M. BENDER,
*Assistant Examiners.*